INVENTORS
RALPH TOWNSEND
JOHN JOSHUA SHARP

Oct. 15, 1957  R. TOWNSEND ET AL  2,810,099
CIRCUITS EMPLOYING MULTI-CATHODE COUNTING TUBES
Filed Dec. 21, 1955  2 Sheets-Sheet 2
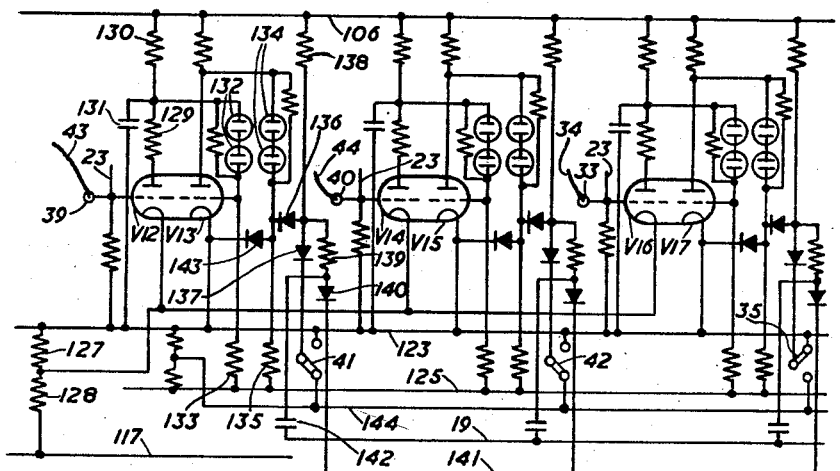
Fig. 3.
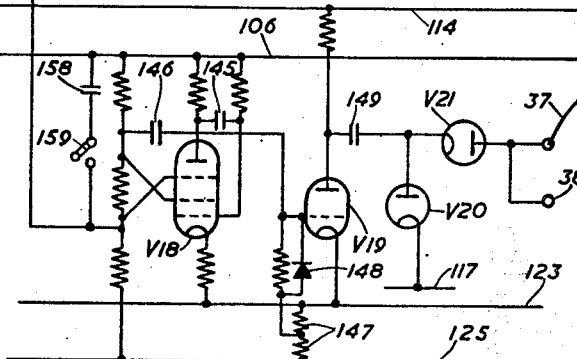
Fig. 4.
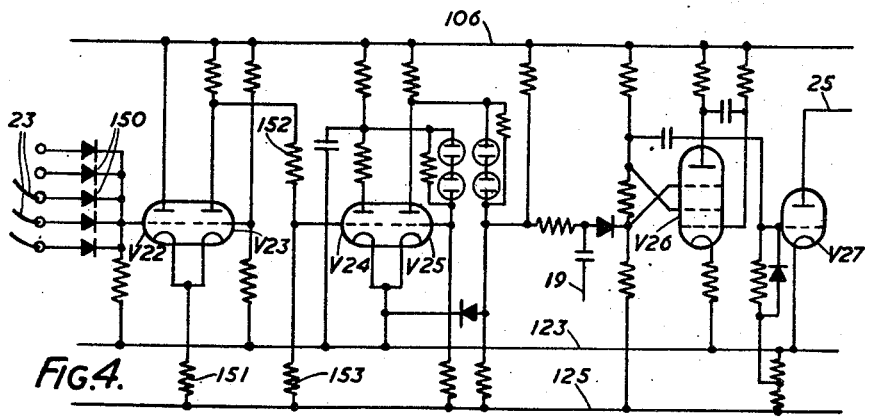
INVENTORS
RALPH TOWNSEND
JOHN JOSHUA SHARP
BY
ATTORNEY United States Patent Office 2,810,099
Patented Oct. 15, 1957

2,810,099

CIRCUITS EMPLOYING MULTI-CATHODE COUNTING TUBES

Ralph Townsend and John Joshua Sharp, Stevenage, England, assignors to The British Tabulating Machine Company Limited, London, England, a British company Application December 21, 1955, Serial No. 554,520

Claims priority, application Great Britain April 7, 1955

11 Claims. (Cl. 315—84.6)

This invention relates to circuits employing multi-cathode gas-filled counting tubes.

The use of gas-filled tubes, in which a discharge may be stepped along from one cathode to the next of a group of cathodes, as a counter is well known. Various forms of such a tube are sold commercially under the name "Dekatron." The standard tube of this type has ten cathodes and therefore counts in the decimal scale. If three such tubes are connected in cascade, with suitable carry circuits, the assemblage will count units, tens and hundreds. Tubes have been built with a different number of cathodes, twelve for example, but it is clear that it is not commercially practicable to manufacture a large range of tubes, each having a different number of cathodes.

There are many applications in which non-decimal counting is required. As one example, input pulses might each represent a weight of one ounce, and it is desired to total the weight in terms of hundred weights, quarters, pounds and ounces. To carry this out, the successive stages of a cascaded counter have to count in scales of 16, 28, 4 and 10 respectively. The counting tubes would have to have 16, 28, 4 and 10 cathodes, respectively.

One object of the invention is to provide a counter employing two or more multi-cathode tubes, in which the scale of counting may have any value up to the total number of cathodes of the tube or tubes forming the counter.

Another object of the invention is to provide a counter in which the scale of counting may have one of two or more values, the operative value being selected by a control voltage or voltages.

According to the invention electronic counting apparatus has two or more multi-cathode gas-filled counting tubes, means preventing the maintenance of an anode-cathode glow discharge in more than one of said tubes at a time, driving means operable by input pulses to step the glow discharge, and means, operable when the discharge is on a pre-determined cathode of one of said tubes, to initiate a glow discharge to a pre-determined cathode of the other, or another, of said tubes. The glow discharge in said one tube may be extinguished as the glow discharge is initiated in the other, or another, tube. The transfer of the glow discharge may be controlled by the pre-determined cathode of said one tube and by the occurrence of an input pulse, means may also be provided for transferring the glow discharge from the other, or another, tube to a pre-determined cathode of said one tube.

The invention will now be described, by way of example, with reference to the accompanying drawings, in which:

Figure 3 is a circuit diagram of one of the jump circuits;

Figure 4 is a circuit diagram of the anode quench circuit.

Figure 1 shows, in block diagram form, a counter which may be switched to operate in a scale of twelve, sixteen or twenty-eight. As shown, the circuit is set to count in a scale of twenty-eight.

Figure 1:
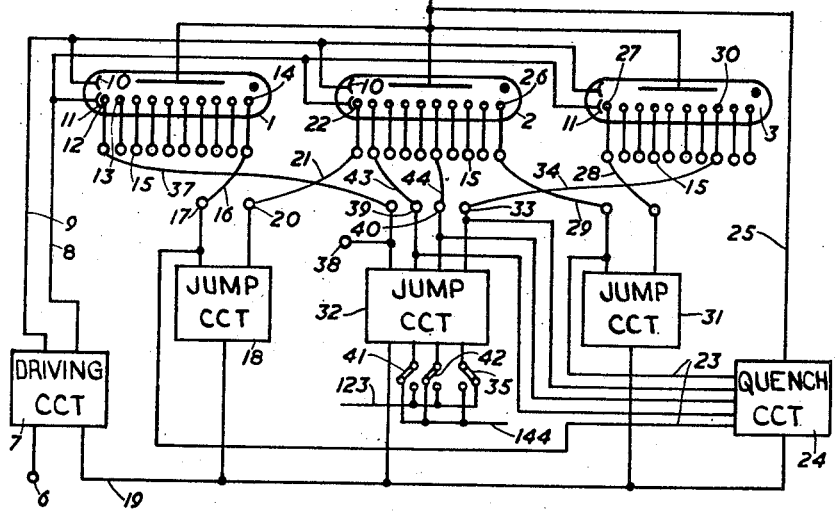
Figure 1 is a block diagram of a counter which may count in any one of three scales of notation.

Three multi-cathode gas-filled counting tubes 1, 2 and 3 each have their anode connected to a positive supply line 114 through a common anode resistor 5. The value of the resistor 5 is such that a glow discharge can be maintained in only one of the tubes 1, 2 and 3 at a time. That is, if a current equal to twice that drawn by one glow discharge flows through the resistor 5, the voltage of the commoned anodes falls below that necessary to maintain a glow discharge.

Positive input pulses to be counted are applied to a terminal 6. Each input pulse operates a driving circuit 7 to produce a negative output pulse on each of two lines 8 and 9. The two pulses are partially overlapping in time. For example, the pulses may be 10 micro-seconds long, with the leading edge of the pulse on the line 9 occuring 7 micro-seconds after the leading edge of the pulse on line 8.

The line 8 is connected to a first guide electrode 11 of each of the tubes 1, 2 and 3. The line 9 is similarly connected to a second guide electrode 10. Before counting begins, the glow discharge is between the anode of the tube 1 and a "0" cathode 12. The method of setting this initial condition will be described later.

A negative pulse on the line 8 causes the discharge to transfer from the cathode 12 to the first guide electrode 11. The delayed pulse on the line 9 transfers the discharge to the second guide electrode 10. When this latter pulse ceases, the discharge transfers to an adjacent "1" cathode 13. A detailed description of the discharge stepping operation is given in an article entitled, "The Dekatron" by R. C. Bacon and J. R. Pollard in "Electronic Engineering," dated May 1950.

Further input pulses will cause the discharge to step along until it is located on a "9" cathode 14. Each of the cathodes has a plug socket 15 connected to it. A connection 16 is made to the socket 15 of the cathode 14 to an input plug socket 17 of a jump circuit 18. When the discharge is located on a particular cathode, the voltage of that cathode rises, so that the jump circuit 18 will now receive a positive conditioning voltage via the connection 16.

The driving circuit 7 produces a positive pulse on a line 19 each time it is operated by an input pulse. The pulses on the line 19 are fed to the jump circuit 18, but are effective to operate it only when it is conditioned. When the circuit 18 receives a pulse from the line 19, resulting from the tenth input pulse it is already conditioned, and it produces a negative pulse at an output socket 20. A connection 21 joints the socket 20 to a socket 15 which is connected to a "10" cathode 22 of the tube 2.

A quench circuit 24 also receives pulses on the line 19, and is conditioned by the voltage at the socket 17, via a line 23. The quench circuit is connected to the anodes of the tubes 1, 2 and 3 by a line 25. The tenth pulse on the line 19 operates the quench circuit, reducing the voltage on the line 25.

The drop in voltage of the anode of the tube 1 extinguishes the discharge. The line 25 rises again after 30 micro-seconds. The negative pulse on the cathode 22 lasts for 70 micro-seconds, so that as the anodes rise, a discharge is initiated between the anode of the tube 2 and the cathode 22, there being a greater voltage difference for this cathode than for any of the others. The anode resistor 5 prevents a discharge being initiated in the tubes 1 and 3.

If the voltage of the cathode 22 is reduced sufficiently, a discharge will be established to this cathode. Due to the common anode resistor 5, the anode of the tube 1 will fall below the point at which the discharge in the tube 1 can be maintained. Hence it is not essential to utilise a quench circuit. The use of the circuit provides a more positive operation and also reduces the transfer time, since quenching starts simultaneously with the fall of the cathode 22.

The discharge will be located on a "19" cathode 26 after a further nine input pulses. The cathode 26 conditions a second jump circuit 31, via a connection 29. The output pulse of the jump circuit 31 is fed by a connection 28 to a "20" cathode 27 of the tube 3. Hence the twentieth input pulse will initiate a discharge between the anode of the tube 3 and the cathode 27. The quench circuit 24 is conditioned by the cathode 27, via a further conditioning line 23, so that it operates to extinguish the discharge in the tube 2.

After a total of twenty-seven input pulses, the discharge will be located on a "27" cathode 30 of the tube 3. Since the counter is operating in a scale of twenty-eight, the next input pulse must cause the transfer of the discharge to the "0" cathode 12 of the tube 1. This transfer is effected by a third jump circuit 32.

The cathode 30 is connected to a gated input socket 33 of the jump circuit 32 by a line 34. If a switch 35 is in the position shown, connecting to a line 123, the arrival of the discharge on the cathode will allow the jump circuit 32 to operate in the same manner as the jump circuit 18. If the switch 35 is in the other position, connecting to a line 144, the cathode 30 is prevented from controlling the jump circuit 32.

The circuit 32 also receives pulses on the line 19. The twenty-eight pulse on this line therefore operates the jump circuit. The output pulse of the jump circuit 32 is fed to the cathode 12 by a connection 37. The quench circuit 24 is conditioned via a further line 23, so that it extinguishes the discharge in the tube 3.

The counting cycle starts again when the discharge has been transferred to the cathode 12. The jump circuit 32 produces an output pulse once for every twenty-eight input pulses, hence this pulse, which is available at a socket 38, may be utilised as a carry pulse to operate a further counter. This further counter may be a decimal multi-cathode counting tube, for example, or a multi-tube counter similar to that formed by the tubes 1, 2 and 3.

A conditioning voltage may also be applied to the jump circuit 32 at two other gated input sockets 39 and 40, to allow the counter to operate in the scales of twelve and sixteen respectively. The socket 39 is made effective by setting a switch 41 to connect to the line 123. By a connection 43, the socket 39 receives a conditioning voltage after eleven input pulses. Consequently, the twelfth input pulse will return the discharge to the cathode 12 and a carry pulse will be available at the socket 38.

The socket 40 is made effective by setting a switch 42 to connect to the line 123. A connection 44 feeds a conditioning voltage to the gate after fifteen pulses. Hence the counter will be reset every sixteen pulses. Thus, by setting the appropriate one of the switches 41, 42 and 35, to connect to the line 123 and leaving the other two connected to the line 144, the counter may be made to operate in a scale of twelve, sixteen or twenty-eight. If the counting scale must be changed rapidly, the manual switches may be replaced by contacts of electromagnet relays, or control voltages corresponding to those of the lines 123 and 144 may be supplied by trigger circuits.

Since the connections to the cathodes of the tubes 1, 2 and 3 are made to plug sockets 15, the counter may be manually adjusted to count in any desired scale up to thirty. For example, if the connection 43 is made to the plug socket 15 of the third cathode from the left of the tube 2, the socket 39 will control counting in a scale of thirteen. Similarly, if the connection 34 is made to the last socket 15, then the socket 33 will control counting in a scale of thirty.

The circuit may be simplified to some extent by making the jump circuits operate as soon as the glow reaches the controlling cathode, instead of waiting until the occurrence of the next pulse on the line 19.

This simplification, however, entails a reduction in overall counting capacity. When the ninth input pulse occurs, the discharge will step on to the cathode 14, but this operates the jump circuit 18, which immediately transfers the discharge to the cathode 22 of the tube 2. Thus the tube 1 has effectively only nine counting cathodes. Similarly, the socket 33 has to be connected to the cathode to which the discharge is transferred by the twenty-eighth pulse.

It will be appreciated that more than three counting tubes can be used for higher scales of notation by coupling succeeding tubes through jump circuits in the same way as the tubes 1 and 2 are coupled. Equally, the tube 3 could be omitted if the required scales of counting do not exceed twenty.

Figure 2:
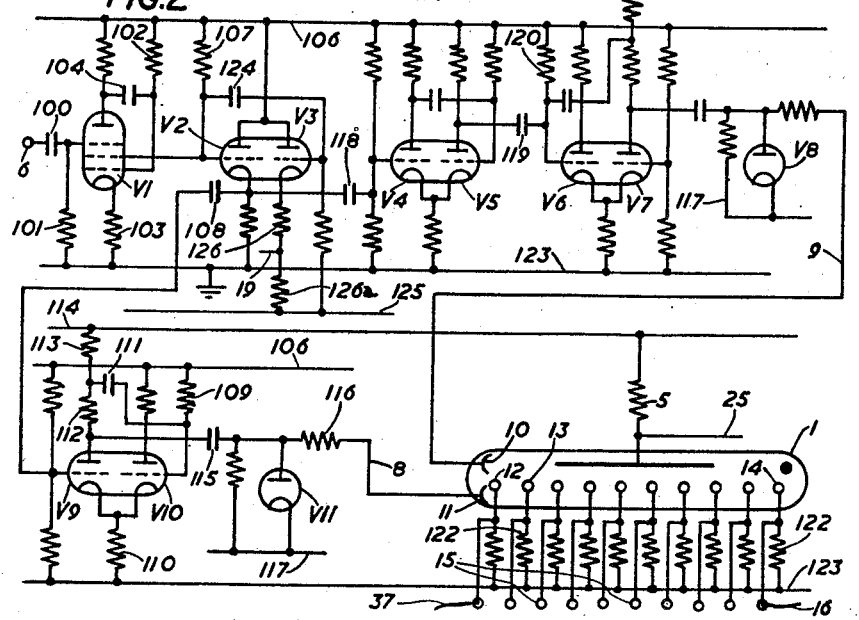
Figure 2 is a circuit diagram of the driving circuit and one of the multi-cathode counting tubes.

Considering the circuits in more detail, the positive input pulse applied to the terminal 6 of the driving circuit is differentiated by a capacitor 100 (Figure 2) and a resistor 101. The differentiated pulse is fed to the suppressor grid of a pentode V1. The control grid of V1 is connected to a +250 volt supply line 106, through a resistor 102. The screen grid normally draws a heavy current through a resistor 107. This current flowing through a cathode resistor 103 raises the cathode to a voltage such that the suppressor grid prevents current flow to the anode.

The differentiated pulse raises the suppressor grid voltage sufficiently to allow current to flow to the anode. This produces a voltage drop which is communicated to the control grid by a capacitor 104, so that the anode and grid voltages run down together. Most of the cathode current is diverted to the anode, allowing the screen voltage to rise. The screen stays at this higher voltage until the anode voltage bottoms, when the current again transfers to the screen.

The screen is directly coupled to the grid of a cathode follower V2. The cathode follower output is fed, via a capacitor 108, to one grid of a flip-flop formed by valves V9 and V10. V10 is normally held conducting by the connection of the grid to the positive line 106 through a resistor 109. The voltage drop across common cathode resistor 110 is sufficient to hold V9 non-conducting.

A positive pulse from the cathode follower V2 drives V9 into conduction. The anode of V9 is connected to a +450 volt supply line 114 through resistors 112 and 113 in series. The junction of these two resistors is connected to the grid of V10 by a capacitor 111. Hence, when V9 conducts, the grid of V10 is driven well below cut-off, and V9 remains conducting.

The grid V10 starts to rise at a rate determined by the time constant of the resistor 109 and the capacitor 111. The time constant is such that the grid reaches the common cathode potential 10 micro-seconds after V10 has been cut-off. As soon as V10 starts to conduct, V9 is cut off and the flip-flop is in the original state.

A 250 volt negative-going pulse at the anode of V9 is fed to a D. C. restoring diode V11, via a capacitor 115. The cathode of the diode V11 is connected to a +40 volt line 117, so that a negative pulse restored to this level, is fed via a resistor 116 and the line 8 to the first guide electrode 11 of the tube 1.

The output from the cathode follower V2 is also fed by a capacitor 118 to one grid of a flip-flop formed by valves V4 and V5. This flip-flop operates in the same manner as that formed by the valves V9 and V10, but the time constant is such that the output pulse lasts 7 micro-seconds.

The anode of V5 is connected to the grid of a valve V6 by a coupling capacitor 119. The valve V6 and a valve V7 are connected to form a further flip-flop, with V6 normally conducting. The capacitor 119 and a resistor 120 form a differentiating circuit, so that the trailing edge of the positive pulse at the anode of V5 produces a negative pulse on the grid of V6, to cut it off. The time constant of the flip-flop is such that V7 conducts for 10 micro-seconds.

The negative pulse at the anode of V7 is D. C. restored to +40 volts by a diode V8, corresponding to the diode V11, and the restored pulse is applied to the second guide electrode 10 of the tube 1 by the line 9. Thus the two guide electrodes each receive a 10 micro-second negative pulse, the pulses overlapping by 3 micro-seconds, for each input pulse at the terminal 6. These paired pulses cause the discharge to step from one cathode to the next. As already explained, the paired pulses are applied in common to all three counting tubes.

The pulse which is applied to the cathode follower V2 is also fed to the grid of a second cathode follower V3, by a coupling capacitor 124. The grid of V3 is connected through a resistor to a —50 volt supply line 125. The cathode of V3 is connected to the same line through resistors 126 and 126a. The line 19 is connected to the junction of the resistors 126 and 126a, so that it receives one 50 micro-second positive pulse for each input pulse.

Each cathode of the tube 1 is connected to the ground line 123 through a resistor 122. The plug sockets 15 are connected directly to their respective cathodes. The cathodes of the tubes 2 and 3 are similarly connected. Hence a plug socket 15 is positive when the discharge is located on the cathode connected to that socket.

The gated input socket 39 of the jump circuit 32 (Figure 1) is connected to the grid of a triode V12 (Figure 3). This triode is normally non-conducting since the grid is at ground potential and the cathode is held positive by a bias potentiometer, formed by two resistors 127 and 128, which is connected between the +40 volt line 117 and the ground line 123. When the discharge is located on the second cathode of the tube 2, the grid of V12 rises sufficiently to allow the triode to conduct.

The anode load of V12 consists of two resistors 129 and 130. The junction of these two resistors is connected to ground through a capacitor 131 and to the grid of a triode V13 through a pair of gas-filled diodes 132. The grid of V13 is also connected to the —50 volt line by a resistor 133.

The diodes 132 are conducting when V12 is non-conducting, hence V13 is also conducting. When V12 conducts the anode voltage starts to fall, but the rate of fall is reduced by the capacitor 131. When the junction of the resistors 129 and 130 has fallen approximately 35 volts, the voltage across the diodes 132 is insufficient to maintain conduction. The extinguishing of the diodes 132 allows the grid of V13 to fall, and it ceases to conduct. Thus the diodes 132 provide a rapid switching of V13.

When the discharge is moved off the second cathode of the tube 2 by a further input pulse, V12 ceases to conduct. The rise of the anode voltage is delayed by the capacitor 131, but eventually the voltage is high enough for the diodes 132 to fire, and V13 conduct once more. Hence the output from the anode of V13 is square wave which is delayed on the input to V12. The capacitor 131 causes the leading and trailing edges of the output to be delayed by 50 and 60 micro-seconds respectively relative to the input.

The anode of V13 is connected through two gas-filled diodes 134 and a resistor 135 to the —50 volt line 125. The voltage across the diodes 134 is not sufficient to strike them when V13 is conducting. The junction of the diodes and the resistor 135 is then maintained at approximately —30 volts by current flowing from the line 106 through a resistor 138, a semi-conductor diode 136 and the resistor 135. The junction of the resistor 138 and the diode 136 is connected to the arm of the switch 41.

The switch may be set so that the arm is connected to the ground line 123, or to the line 144 which is held at approximately —40 volts.

If V13 becomes non-conducting, and the switch 41 is connected to ground, the diodes 134 are fired, and both sides of the diode 136 rise to ground potential, and are held there by conduction through diodes 137 and 143. The junction of the diodes 136 and 137 is connected by a resistor 139 and a diode 140 to a line 141. This line is at approximately ground potential.

Each pulse on the line 19 is applied to the junction of the resistor 139 and the diode 140 by a coupling capacitor 142. If the junction of the diodes 136 and 137 is at ground potential, a pulse on the line 19 will cause the diode 140 to conduct, so transmitting the pulse to the line 141. Pulses on the line 19 are approximately 25 volts in amplitude, so that if the diode junction is held at or below —30 volts by conduction in V13 and/or by the diode 137 being connected to the line 144, the diode 140 will prevent a pulse being transmitted to the line 141. Hence the line 141 receives a pulse under control of V12 only when a pulse occurs on the line 19, the switch 41 connects the diode 137 to ground, and V13 is non-conducting due to the discharge being located on the cathode to which the socket 39 is connected.

The socket 40 is connected to the grid of a valve V14. Valves V14 and V15 operate in the same way as the valves V12 and V13. Pulses from the line 19 are fed to a semiconductor diode gating circuit which is controlled by V15 and the switch 42. The output pulses from the gating circuit are fed to the line 141. Valves V16 and V17 and an associated gating circuit feed pulses to the line 141 under control of the voltage at the socket 33 and the switch 35, in the same way as V12 and V13. Hence the location of the discharge on any of the pre-selected cathodes of the counting tubes may be made effective to control the feeding of a pulse to the line 141, by appropriate setting of the switches 41, 42 and 35.

The line 141 is connected to the suppressor grid of a pentode V18, which is operated as a triggered transitron pulse generator. The suppressor grid is normally below cut-off, so that all the cathode current flows to the screen grid. A positive pulse on the line 141 brings the suppressor grid above cut-off, and the major part of the cathode current is diverted to the anode. The fall in anode voltage is fed to the control grid by a coupling capacitor 145, so that the anode and the control grid run down together. During the run down, the screen voltage is high. After 70 micro-seconds the anode voltage reaches minimum, the screen grid begins to take more current and the valve rapidly reverts to the original condition.

The 70 micro-second pulse on the screen of V18 is fed to the grid of a triode V19 by a coupling capacitor 146. The triode is normally cut off by the bias voltage from a potentiometer 147. The pulse is D. C. restored by a diode 148, and allows V19 to conduct to produce a 350 volt negative pulse at the anode. This output pulse is applied to the cathode 12 of the tube 1 via a coupling capacitor 149, an isolating diode V21, and the connection 37. The output pulse is restored to +40 volts by a further diode V20. This pulse is also available at the socket 38 as a carry pulse.

The quench circuit 24 (Figures 1 and 4) is very similar to the jump circuit already described, except for the input and output arrangements. The lines 23 are connected through semi-conductor isolating diodes 150 to the grid of a triode V22. This triode shares a cathode resistor 151 with a further triode V23. The valve V23 is normally conducting due to a positive bias applied to the grid. The voltage across the resistor 151 is sufficient to maintain V22 cut off.

When any one of the lines 23 rises due to the arrival of the discharge on a corresponding cathode, V22 is allowed to conduct. The commoned cathodes rise sufficiently to cut off current 152 and 155 to the −50 volt line 125. The junction of the two resistors is either at ground potential, or approximately the same positive voltage as a counting tube cathode on which the discharge is located, depending upon whether V23 is conducting or non-conducting.

The grid of a triode V24 is connected to the junction of the resistors 152 and 153. The valve V24 and a valve V25 together form a pulse delay circuit similar to that formed by the valves V12 and V13 (Figure 3). Hence V25 provides a delayed positive output pulse each time one of the lines 23 is pulsed. This allows a pulse from the line 19 to be fed to a transitron pulse generator V26. Since no gating is required, the coupling network is simplified by the omission of diodes corresponding to the diodes 136 and 137. The circuit constants associated with V26 are such that it produces a 30 micro-second positive pulse on the screen.

The positive pulse from the screen of V26 causes a triode V27 to conduct heavily. The anode of V27 is connected by the line 25 to the anodes of the counting tubes 1, 2 and 3. The additional current through the common load resistor 5 reduces the voltage applied to the counting tubes below that necessary to maintain a discharge. After 30 micro-seconds the anodes rise and the discharge is re-established to that cathode which is still being held negative by the output from one of the jump circuits.

The jump circuits 18 and 31 are simplified forms of the jump circuit 32, since a single ungated input is employed. These simplified circuits consist of a delayed pulse generator, a transitron pulse generator and an output valve and associated output circuit, that is, they comprise valves corresponding to the valves V12, V13, V18, V19, V20 and V21 of Figure 3. The coupling from the delayed pulse generator is of the form used between the valves V25 and V26 (Figure 4).

What we claim is:

1. An electronic counter comprising at least two multi-cathode gas discharge tubes, a common source of anode supply voltage for said tubes, a common resistive impedance connecting the anodes of all said tubes to said source, said impedance being such that an anode to cathode discharge is maintainable in only one of said tubes at a time, transfer electrodes within each said tube, means for applying input pulses to be counted to said transfer electrodes of all said tubes to step the discharge along the cathodes of the tube in which the discharge is maintained, control means connected to one cathode of a first of said tubes, means for applying said input pulses to said control means, said control means producing an output pulse in response to an input pulse when the discharge is located on said one cathode, and means for applying said output pulse to one cathode of a second of said tubes to initiate a discharge to that cathode and thereby transfer the discharge from said one cathode of said first tube to said one cathode of said second tube.

2. An electronic counter comprising at least two multi-cathode gas discharge tubes, a common source of anode supply voltage for said tubes, a common resistive impedance connecting the anodes of all said tubes to said source, said impedance being such that an anode to cathode discharge is maintainable in only one of said tubes at a time, means for applying input pulses to all said tubes in common to step the discharge along the cathodes of the tube in which the discharge is maintained, a plurality of control means each for transferring the discharge from a first selected cathode to a second selected cathode of said tubes, means for connecting each said control means to said first and second selected cathodes associated with said control means, means for applying said input pulses to all said control means in common, each said control means being effective when the discharge is located on the first selected cathode associated therewith to apply an output pulse to said second selected cathode associated therewith in response to an input pulse, said control means being connected to said cathodes whereby the discharge is transferred from tube to tube in a predetermined sequence.

3. Electronic pulse counting apparatus comprising at least two multi-cathode gas discharge tubes, means for applying operating voltages to the tubes such that a discharge can be maintained in any one tube at a time, means for applying input pulses to the tubes in common to step the discharge along the cathodes of each tube in a predetermined sequence, when the discharge is maintained in that tube, first control means interconnecting the tubes to operate in sequence, and having an input and an output, said input being connected to a cathode of one tube and to said means for applying said input pulses and said output being connected to a cathode of another tube, each control means, when conditioned by the location of the discharge on the cathode to which said input is connected, generating a pulse at said output in response to an input pulse, the generated pulse causing the discharge to transfer to the cathode to which the pulse is applied, second control means connected to the same cathodes as those to which the inputs of the first control means are connected and said means for applying said input pulses, for generating a pulse each time any one of said first control means is operated and means for applying the pulse generated by said second control means to the anodes of said tubes to extinguish the discharge which caused conditioning of the control means.

4. An electronic counter comprising a source of input pulses to be counted, at least two multi-cathode gas discharge counting tubes forming a single denominational counting unit, a resistor common to the anode circuits of all the tubes, which resistor allows the maintenance of a discharge in only one of the tubes at a time, control means associated with each tube and operative to transfer the discharge from tube to tube in a predetermined sequence, each control means being connected to a cathode of the preceding tube in the sequence and to said source of input pulses to be counted, which is also connected to all the tubes, and producing a transfer pulse when the discharge is located on said cathode and an input pulse occurs, and means for applying said transfer pulse to a cathode of the tube with which the control means is associated.

5. An electronic pulse counter for counting pulses in a predetermined scale of notation, comprising a plurality of multi-cathode gas-filled counting tubes, a common resistive anode impedance permitting the maintenance of an anode-cathode discharge in one only of said tubes at any one time, means for applying the pulses to be counted to said tubes in common to cause stepping of the discharge along said cathodes of the tube in which the discharge is maintained, at least one jump circuit connecting said tubes in a prescribed sequence for transferring the discharge from a selected cathode of one tube to a selected cathode of the next tube in said sequence, a further jump circuit for transferring the discharge from a selected cathode of the last tube in said sequence to a selected cathode of the first tube in said sequence whereby the discharge is returned to said first tube after the application of a predetermined number of said pulses and means for applying said pulses to each of said jump circuits in common, each said jump circuit having an input and an output connected respectively to the cathodes from which and to which transfer is to be made, and being responsive to a pulse from said applying means when the discharge is located on the cathode from which transfer is to be made to apply an output pulse to the cathode to which transfer is to be made.

6. An electronic pulse counter for counting pulses in a predetermined scale of notation, comprising a plurality of multi-cathode gas-filled counting tubes, a common resistive anode impedance permitting the maintenance of an anode-cathode discharge in one only of said tubes at any one time, means for applying the pulses to be counted to said tubes in common to cause stepping of the discharge along said cathodes of the tube in which the discharge is maintained, at least one jump circuit connecting said tubes in a prescribed sequence for transferring the discharge from a selected cathode of one tube to a selected cathode of the next tube in said sequence, a further jump circuit for transferring the discharge from a selected cathode of the last tube in said sequence to a selected cathode of the first tube in said sequence whereby the discharge is returned to said first tube after the application of a predetermined number of said pulses, means for applying said pulses to each of said jump circuits in common, each said jump circuit having an input and an output connected respectively to the cathodes from which and to which transfer is to be made, and being responsive to a pulse from said applying means when the discharge is located on the cathode from which transfer is to be made to apply an output pulse to the cathode to which transfer is to be made, a quench circuit connected to each of the cathodes from which transfer is to be made for generating a quench pulse when any of said jump circuits are operated, and means for applying said quench pulse to the anodes of said tubes to extinguish the discharge in the tube from which transfer is made.

7. An electronic pulse counter comprising a plurality of multi-cathode gas-filled counting tubes, a common resistive anode impedance for all said tubes permitting anode-cathode discharge in one only of said tubes at any one time, means for applying the pulses to be counted to said tubes to cause stepping of the discharge along said cathodes of the tube in which the discharge is maintained, at least one jump circuit connecting said tubes in a prescribed sequence for transferring the discharge from a selected cathode of one tube to a selected cathode of the next tube in said sequence, means for applying said pulses to each said jump circuit in common, each said jump circuit having an input and an output connected respectively to cathodes from which and to which transfer is to be made and being responsive to a pulse from said applying means when the discharge is located on the cathode from which transfer is to be made to apply an output pulse to the cathode to which transfer is to be made, a further jump circuit also connected to said pulse applying means and having a plurality of inputs connected to different selected cathodes of said tubes and an output connected to a selected cathode of the first tube in said sequence, and means for rendering any one of said inputs effective, said further jump circuit producing at its output an output pulse in response to a pulse from said pulse applying means when the discharge is located on the cathode to which the effective input is connected.

8. An electronic pulse counter comprising a plurality of multi-cathode gas-filled counting tubes, a common resistive anode impedance for all said tubes permitting anode-cathode discharge in one only of said tubes at any one time, means for applying the pulses to be counted to said tubes to cause stepping of the discharge along said cathodes of the tube in which the discharge is maintained, at least one jump circuit connecting said tubes in a prescribed sequence for transferring the discharge from a selected cathode of one tube to a selected cathode of the next tube in said sequence, means for applying said pulses to each said jump circuit in common, each said jump circuit having an input and an output connected respectively to cathodes from which and to which transfer is to be made and being responsive to a pulse from said applying means when the discharge is located on the cathode from which transfer is to be made to apply an output pulse to the cathode to which transfer is to be made, a further jump circuit also connected to said pulse applying means and having a plurality of inputs connected to different selected cathodes of said tubes and an output connected to a selected cathode of the first tube in said sequence, manually adjustable means for rendering any one of said inputs effective, said further jump circuit producing at its output an output pulse in response to a pulse from said pulse applying means when the discharge is located on the cathode to which the effective input is connected, a quench circuit for extinguishing the discharge in the tube from which transfer is made, said quench circuit being connected to each of the cathodes to which the inputs of said jump circuits are connected for generating a quench pulse when any of said jump circuits are operated, and means for applying said quench pulse to the anodes of said tubes.

9. An electronic pulse counter comprising a plurality of multi-cathode gas-filled counting tubes; a common resistive anode impedance for all said tubes permitting anode-cathode discharge in one only of said tubes at any one time; stepping means operated by the pulses to be counted and effective on all said tubes for stepping the discharge along said cathodes of the tube in which the discharge is maintained; at least one jump circuit connecting said tubes in a presented sequence for transferring the discharge from a selected cathode of one tube to a selected cathode of the next tube in said sequence; a further jump circuit for transferring the discharge from a selected cathode of the last tube in said sequence to a selected cathode of the first tube in said sequence whereby the discharge is returned to said first tube after a predetermined number of said pulses, each said jump circuit comprising a first delayed pulse generator connected to the cathode from which the transfer is to be made, for producing a pulse with a delay when the discharge is located on that cathode and means responsive to the simultaneous occurrence of said delayed pulse and a pulse to be counted for applying to the cathode to which transfer is to be made an output pulse to establish a discharge thereto; a second delayed pulse generator operable concurrently with said first delayed pulse generator and means responsive to the simultaneous occurrence of a pulse from said second pulse generator and a pulse to be counted for causing the anode voltage of said tubes to be reduced below the value necessary to maintain the discharge for a time less than the duration of said output pulse.

10. An electronic pulse counter as claimed in claim 9 in which each said tube has a pair of guide electrodes for stepping the discharge and said stepping means comprises a driving circuit operated by the pulses to be counted for producing a pair of pulses overlapping in time and means for applying said pair of pulses to said guide electrodes.

11. An electronic pulse counter as claimed in claim 10 in which said driving circuit includes means for producing additionally a single pulse in response to each pulse to be counted, and means for applying said single pulse to said first and second pulse generators.

References Cited in the file of this patent

UNITED STATES PATENTS

| | | |
|---|---|---|
| 2,516,915 | Reeves | Aug. 1, 1950 |
| 2,607,891 | Townsend | Aug. 19, 1952 |
| 2,649,580 | Dunn | Aug. 18, 1953 |
| 2,664,555 | Thomas et al. | Dec. 29, 1953 |